S. C. HOEN.
SPRING CUSHIONED WHEEL.
APPLICATION FILED FEB. 13, 1913.
1,100,133. Patented June 16, 1914.
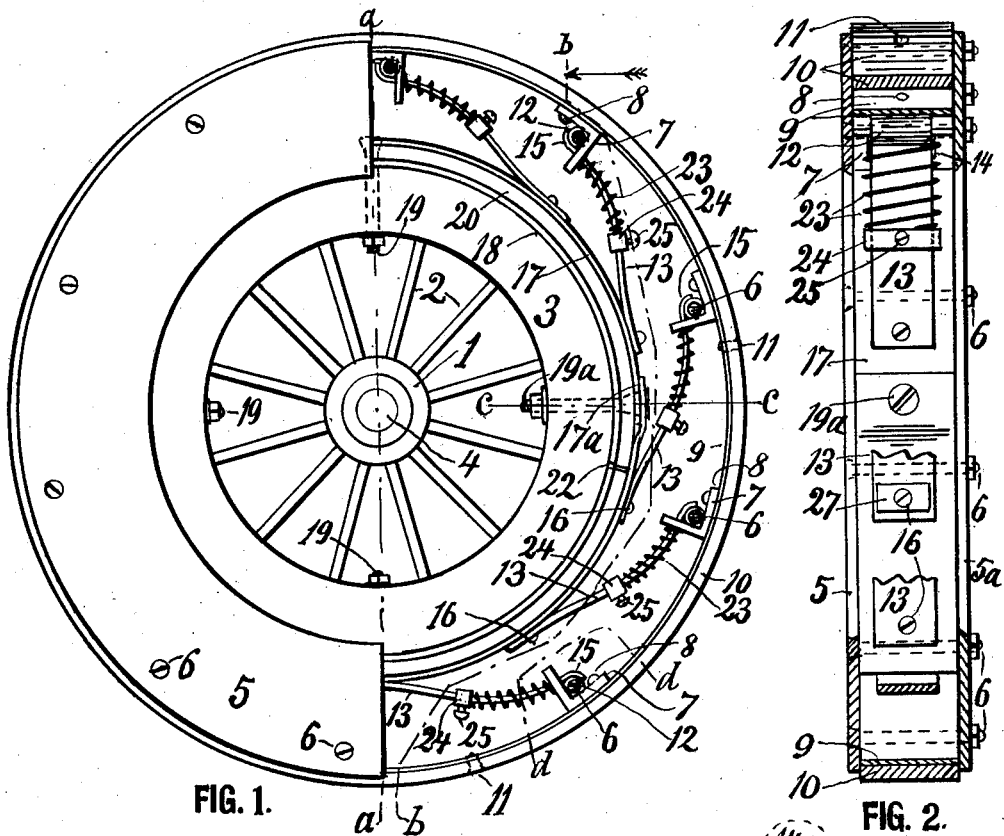
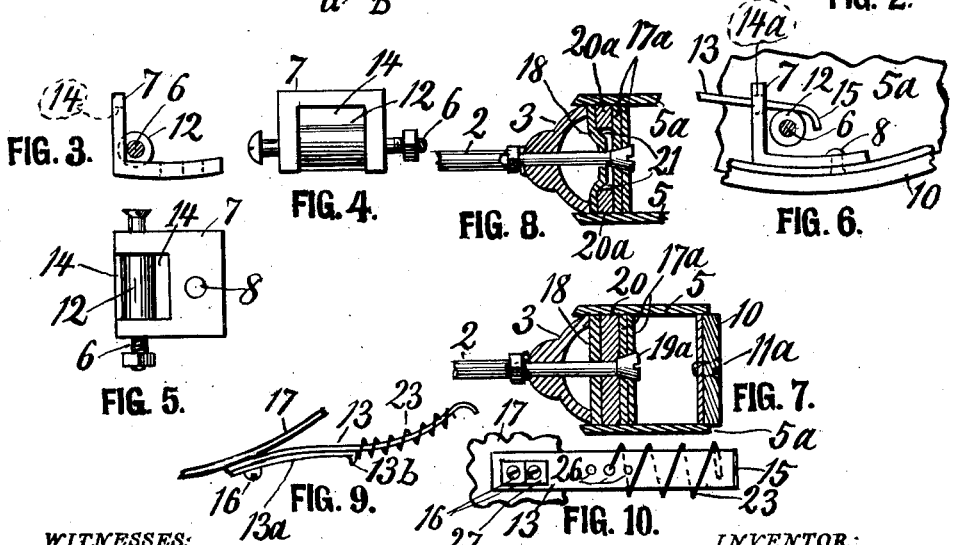
WITNESSES:
A. C. Carlsen.
E. C. Carlsen.
INVENTOR:
Samuel C. Hoen.
By his ATTORNEY:
A. M. Carlsen.

UNITED STATES PATENT OFFICE.

SAMUEL C. HOEN, OF ST. PAUL, MINNESOTA, ASSIGNOR OF ONE-HALF TO ALFRED AHLBERG, OF ST. PAUL, MINNESOTA.

SPRING-CUSHIONED WHEEL.

1,100,133.  Specification of Letters Patent.  Patented June 16, 1914.

Application filed February 13, 1913. Serial No. 748,117.

*To all whom it may concern:*

Be it known that I, SAMUEL C. HOEN, a citizen of the United States, residing at St. Paul, in the county of Ramsey and State of Minnesota, have invented a new and useful Spring-Cushioned Wheel, of which the following is a specification.

My invention relates to supporting wheels for vehicles of all descriptions, including bicycles, automobiles, buggies, hacks, wagons and cars.

The main object of the invention is to provide supporting wheels having internal cushion springs arranged in a novel and advantageous manner for serving the purpose of pneumatic tires, so as to avoid using the latter, as they are apt to get punctured, cracked or otherwise to get out of order.

Another object is to make my improvement applicable also to wheels already manufactured, or even in use.

In the accompanying drawing, Figure 1 is a side elevation of a vehicle wheel embodying my improvements, with the annular side plates 5, 5ª in diametrical section on the line $a$—$a$. Fig. 2 is a right hand edge or face view of the wheel in Fig. 1 with the felly ring 9 and tire intersected on the line $b$—$b$ Fig. 1. Fig. 3 is a detail side view of one of the spring guiding brackets 7 in Fig. 1, and the adjacent roller and bolt, the latter in section. Fig. 4 is a left hand end view of Fig. 3, with the bolt intact. Fig. 5 is a bottom view of Fig. 4 with the head of the bolt modified. Fig. 6 is a slightly enlarged fragmental view of area within line $d$—$d$ Fig. 1, showing a modification, with the plate 5ª added and the spring 23 omitted. Fig. 7 is a section on the line $c$—$c$ Fig. 1 with the spring 13 omitted and the side plates 5, 5ª in place and intersected; said view shows a modification of Fig. 1. Fig. 8 is a portion of Fig. 7 modified. Fig. 9 is an edge view of one of the flat springs 13, showing a modification of the adjacent parts. Fig. 10 is a bottom view of Fig. 9 differently modified.

Referring to the drawing by reference numerals, 1 designates the hub, 2 the spokes and 3 the outer ring of an ordinary automobile wheel from which the pneumatic rubber tire has been removed and my cushion device substituted; 1, 2 and 3 therefore also designate the central or hub section of any wheel so built that it embodies my invention.

4 designates the axle of the wheel and may be either journaled or secured in the hub.

Snugly but slidably fitted at the sides of the ring 3 of the hub section are two annular plates 5 and 5ª, which by bolts 6 are drawn tightly against the sides of a circular series of angular brackets 7 and a felly ring 9, to which said brackets are secured by either rivets or screws 8. Tightly fitted about said felly 9 is a solid tire 10, made of rubber, leather or other soft material; the tire projects partly beyond the side plates 5, 5ª and is partly engaged between said plates against lateral slipping. If the wheel is a driver, a few rivets 11 (shown in Figs. 1 and 2) or screws placed as 11ª in Fig. 7 may be used to prevent rotation on the tire or the felly.

Upon each bolt 6 is mounted an antifriction roller 12, against which bears the outer end of a flat spring 13, which is guided in an aperture 14 in the bracket and is formed with a curve or hook 15, to prevent its withdrawal from engagement with the roller. The inner end of said flat spring is secured by either a rivet or a screw 16 to flat metal rings 17 and 18, which are secured together and to the hub section 3 by a few bolts 19, as shown in Fig. 1. Between said rings 17, 18 is inserted a soft packing ring 20, which may be in one solid ring, as in Fig. 7, or in two narrow rings as 20ª in Fig. 8; in the latter instance the ring 18 is channel-shaped, forming two recesses 21 for said rings 20ª, and an intermediate ridge separating the packing rings.

In order to draw the ring 17 tightly about the rings 20, 18 and 3, said ring 17 has its ends overlapped, as best shown at 17ª in Fig. 1, and through the overlapped ends is passed the bolt 19ª, whose head is cone-shaped, or wedge-shaped so as to force the ends of the ring in over each other until their holes for said bolt get as near as possible into central position to each other; the ring being made short enough for such tightening; and if the ring should be found to be loose on the hub section, suitable packing may be inserted between the rings 17 and 20, or 20 and 18, or 18 and 3. The rings 18 and 20 are separable as shown at 22 in Fig. 1.

Upon each flat spring 13 is placed a helical spring 23, which is more or less compressed again the bracket 7, the inner end of the spring being resisted by a yoke 24, which is adjustably secured upon the flat spring by a screw 25.

Referring further to the modifications, it is shown in Fig. 10 that the spring 23 may have its inner end engaged alternately in either one of the holes 26 in the flat spring, instead of against the yoke 24 in Figs. 1 and 2. In said Fig. 10 is also shown that the spring 13 may be secured by two screws 16, and that whether one or two screws be employed, the screw nearest the vibrated part of the spring may have a large washer 27, (shown also in Fig. 2) to prevent breaking of the spring at the screw-hole. In Fig. 9 such washer is made long enough to constitute an auxiliary spring member 13$^a$, whose outer end, 13$^b$, resists the inner end of spring 23, to hold the latter partly compressed.

While in Figs. 1, 3, 4 and 5 the roller 12 is shown as being placed partly into the clearing 14 in the bracket, and the bolt 6 occupying the very angular corner of the bracket, I have in Fig. 6 indicated that the bracket may simply have an aperture 14$^a$ for the spring, and the bolt 6 is placed clear of the bracket, and in that event the roller 12 may extend with its ends almost into contact with the plates 5, 5$^a$, as will be clearly understood without illustration.

To have the bolts 6 with round heads, as in Fig. 4, or with flat heads, as in Fig. 5, is of course a mere matter of choice and a more or less neat job.

In the operation or use of the invention, when weight gets on the axle 4 and hub section 3, the springs 13 in the lower half of the wheel will yield with resistance and also slide in the brackets and thereby cause the springs 23 to offer additional resistance. If the vehicle is an extra heavy one, or is to be heavily loaded, the plate 5$^a$ may be removed while the tension of the springs 23 is increased.

The packing ring 20, or rings 20$^a$ exclude all dust and dirt from the spring mechanism, and also aid in making the motion of the felly section on the hub section as noiseless as possible.

As already stated, the hub section 1, 2, 3 may be manufactured with the felly section, or it may consist of the entire wheel of an automobile or other vehicle, with the pneumatic tire (if any such there be) removed therefrom, and holes drilled through the felly, or part 3, for the bolts 19 and 19$^a$.

What I claim is:

1. In a spring-cushioned wheel, the combination with a felly section comprising a felly ring and annular side plates secured thereon, and apertured brackets fixed within the ring and antifriction rollers adjacent the brackets, of a hub section slidable between the side plates and a series of tangential flat springs carried by the hub section and having their outer ends slidable in the brackets and contacting with the rollers; a helical spring encircling each flat spring, and means for keeping each helical spring partly compressed against the bracket.

2. In a spring-cushioned wheel, the combination with a felly section composed of a felly ring and annular side plates secured thereto, and apertured brackets fixed within the ring and antifriction rollers adjacent the brackets, of a hub section slidable between the side plates and a series of tangential flat springs carried by the hub section and having their outer ends slidable in the brackets and contacting with the rollers; a helical spring encircling each flat spring, means on each flat spring for keeping the helical spring partly compressed against the bracket, and means for adjusting the tension of said helical spring.

3. In a spring cushioned wheel, the combination with a hub section, of a felly section comprising an inner ring securable about the hub section, tangential springs secured to and having their outer ends curved outward, a felly ring having at its inner side a series of angular brackets, each provided with an aperture in which the outer ends of the springs are guided and retained, an annular plate at each side of the felly ring and slidable on the sides of the hub section, bolts securing said plates together, said bolts being each passed through the two plates and intermediate the plates contacting with the inner angle of one of the brackets and supporting the springs between their curved ends and the brackets and resisting the withdrawal of said curved ends.

4. In a spring cushioned wheel, the combination with a hub section, of a felly section comprising an inner ring securable about the hub section, tangential springs secured to said inner ring, a felly ring having at its inner side a series of apertured brackets in which the outer ends of the springs are guided, an annular plate at each side of the felly ring and slidable on the sides of the hub section, bolts passed through said plates to draw them tight against the sides of the felly ring, and antifriction rollers mounted on said bolts between the plates and so near the brackets that each spring is supported on one of the rollers.

In testimony whereof I affix my signature, in presence of two witnesses.

SAMUEL C. HOEN.

Witnesses:
A. G. HULTGREN,
CLARENCE T. LEDON.

---

Copies of this patent may be obtained for five cents each, by addressing the "Commissioner of Patents, Washington, D. C."